United States Patent
Bhaskaran et al.

(10) Patent No.: US 10,725,323 B2
(45) Date of Patent: Jul. 28, 2020

(54) DISPLAY APPARATUS

(71) Applicant: Bodle Technologies Ltd, Oxford, Oxfordshire (GB)

(72) Inventors: Harish Bhaskaran, Horton-cum Studley (GB); Peiman Hosseini, Bicester (GB); Ben Broughton, Marston (GB); Richard Holliday, Bicester (GB)

(73) Assignee: BODLE TECHNOLOGIES LTD, Oxford, Oxfordshire (GB)

( * ) Notice: Subject to any disclaimer, the term of this patent is extended or adjusted under 35 U.S.C. 154(b) by 0 days.

(21) Appl. No.: 16/469,222

(22) PCT Filed: Nov. 14, 2017

(86) PCT No.: PCT/GB2017/053422
§ 371 (c)(1),
(2) Date: Jun. 13, 2019

(87) PCT Pub. No.: WO2018/109430
PCT Pub. Date: Jun. 21, 2018

(65) Prior Publication Data
US 2020/0033644 A1    Jan. 30, 2020

(30) Foreign Application Priority Data
Dec. 13, 2016    (GB) .................................. 1621180.7

(51) Int. Cl.
*F21V 8/00* (2006.01)
*G02B 5/28* (2006.01)
(Continued)

(52) U.S. Cl.
CPC ........... *G02F 1/0147* (2013.01); *G02B 5/305* (2013.01); *G02B 6/0053* (2013.01); *G02B 5/286* (2013.01); *G02F 1/1334* (2013.01)

(58) Field of Classification Search
CPC .............................. G02F 1/0147; G02B 5/305
See application file for complete search history.

(56) References Cited

U.S. PATENT DOCUMENTS 6,081,305 A    6/2000 Sato et al.
6,312,304 B1   11/2001 Duthaler et al.
(Continued)

FOREIGN PATENT DOCUMENTS

EP    3 203 309    8/2017
EP    3 299 872    3/2018
(Continued)

OTHER PUBLICATIONS

Great Britain Search Report dated May 31, 2017 issued in Great Britain Patent Application No. 1621180.7, 3 pp.
(Continued)

*Primary Examiner* — Sung H Pak
(74) *Attorney, Agent, or Firm* — Nixon & Vanderhye P.C.

(57) ABSTRACT

A display apparatus includes an optically opaque layer and one or more stacks of additional layers provided on the optically opaque layer. Each stack has an optically switchable layer. A plurality of switching elements are located on a side of the optically opaque layer opposite to the one or more stacks. Each switching element is operable to apply a signal, for example an electrical signal or a thermal signal, through the optically opaque layer to a switchable portion of the optically switchable layer and thereby change an appearance of the switchable portion when viewed from a viewing side of the display apparatus. The surface area of the optically opaque layer on the viewing side is at least 10% larger than the total surface area of the switchable portions on the viewing side.

20 Claims, 4 Drawing Sheets

(51) Int. Cl.
  *G02F 1/1334*  (2006.01)
  *G02F 1/01*   (2006.01)
  *G02B 5/30*   (2006.01)

(56) References Cited

U.S. PATENT DOCUMENTS

| | | | |
|---|---|---|---|
| 6,545,731 B2 * | 4/2003 | Melnik | G02F 1/136209 |
| | | | 349/110 |
| 6,686,976 B2 * | 2/2004 | Sato | G02F 1/136277 |
| | | | 349/43 |
| 10,146,095 B2 * | 12/2018 | Ochiai | G02F 1/136209 |
| 2012/0154729 A1 | 6/2012 | Lee | |
| 2019/0198820 A1 | 6/2019 | Ko et al. | |

FOREIGN PATENT DOCUMENTS

| | | |
|---|---|---|
| JP | 2006-23721 | 1/2006 |
| JP | 2012-128001 | 7/2012 |
| WO | WO 2015/097468 | 7/2015 |
| WO | WO 2015/097469 | 7/2015 |
| WO | WO 2017/064509 | 4/2017 |

OTHER PUBLICATIONS

Hosseini, Peiman et al., "An Optoelectronic Framework Enabled by Low-Dimensional Phase-Change Films," Nature, vol. 511, Jul. 10, 2014, pp. 206-211.

International Search Report dated Feb. 9, 2018 issued in PCT International Patent Application No. PCT/GB2017/053422, 4 pp.

* cited by examiner

US 10,725,323 B2

DISPLAY APPARATUS

This application is the U.S. national phase of International Application No. PCT/GB2017/053422 filed Nov. 14, 2017 which designated the U.S. and claims priority to Great Britain Patent Application No. 1621180.7 filed Dec. 13, 2016, the entire contents of each of which are hereby incorporated by reference.

The invention relates to a display apparatus, particularly a display apparatus in which signals are sent to optically switchable material through an optically opaque layer, particularly a reflective layer.

Digital displays having individually addressable regions of optically switchable material are known.

In a liquid crystal display (LCD), a layer of liquid crystal material is sandwiched between two glass sheets. A pattern of transparent electrode regions is applied to the inner surfaces of the glass sheets. Polarising films are applied to the outer surfaces. An electronic control apparatus selectively applies a voltage to the electrode regions which determines whether light passing through the liquid crystal material (usually supplied by a backlight waveguide) in the electrode regions is transmitted or absorbed by a subsequent polarising film.

In an organic light emitting diode (OLED) display, a stack of organic material layers defines a light emitting diode structure. Typically, rather than being a continuous layer, the OLED layers are patterned in registration with patterned electrode regions, and the associated control electronics selectively produce a current via the electrode regions through the diode, resulting in the emission of light.

In another type of display, the optically switchable material comprises phase change material (PCM) having a refractive index that can be thermally or electrically switched between different stable states. Interference effects defined by the PCM and additional spacer layers and/or capping layers define the switchable optical properties provided by different sub-pixels.

FIG. 1 depicts example driving electronics for a display device. The architecture is applicable to LCDs, OLED displays, PCM based displays, and other display types. An array of independently addressable sub-pixels 2 are arranged in rows and columns on a display substrate 5. In FIG. 1 only four such sub-pixels 2 are shown for clarity, but it will be understood that in a real display many more sub-pixels would be provided. Electronic control signals 4 are provided by a control ASIC 6, based on an input data signal 8, to gate driver ICs 10 and column driver ICs 12. DC power 18 is provided via a DC/DC converter 20 to the gate driver ICs 10, the control ASIC 6 and backlight LEDs 22. The gate driver ICs 10 and column driver ICs 12 then address each of the sub-pixels 2 respectively via M row lines 14 and N column lines 16. Individual sub-pixels 2 are connected at each intersection between the row lines 14 and column lines 16 via one or more thin-film transistors. This allows any sub-pixel 2 in the M×N array to be addressed independently with only M+N, rather than M×N connections to the display. Typically, the number of electrical connections to the display itself is further reduced by the inclusion of some display driver circuitry on the display substrate, at the edges of the array. Input data may be supplied to the display sequentially via a single channel during a given frame time, along with timing and dc power signals. On-substrate circuitry distributes this serial data signal to the intended sub-pixels in the array, as well as optionally converting digital data to analogue switching element control voltages. This on-substrate circuitry commonly determines the size of the inactive bezel surrounding a display.

In LCDs, OLEDs and other display types, the optically switchable material providing the sub-pixels is typically confined to the addressable regions. This may be because deposition of the optically switchable material is an integral part of the display manufacturing process, because the optically switchable material is expensive, and/or because the optically switchable material requires encapsulation because it is liquid or is degraded by contact with air or water. This means that when the display is housed in a final device, it is typically very visibly clear what area within the device surface the display occupies, even when the display is not in use, which is undesirable aesthetically. In the context of LCDs, a solution to this issue has been to extend a top polariser of an LCD beyond the active display area or to cover the entire display and front surface of the device with a darkened or partially mirrored plastic or glass cover sheet. A schematic of an LCD stack with an extended cover sheet (which may be darkened or provide a partial mirror effect) to provide a uniform visual appearance of the front surface of the device while the display is off, is given in FIG. 2. This LCD stack comprises LED emitters 30, backlight waveguide 31, lower polariser 32, active matrix substrate 33, liquid crystal layer 34, colour filter substrate 35, upper (exit) polariser 36, and extended cover sheet 37. This approach has the disadvantage that the transmission of light from the display itself is affected, decreasing the display efficiency and increasing its power requirement. Furthermore, in practice the active display region is still visible due to reflection from the transparent electrodes, or emission/reflection of ambient light from the liquid crystal material. The extended cover sheet may also reduce manufacturing flexibility by making it more difficult to switch between different combinations of components after the extended cover sheet has been applied.

Finally, as displays become thinner and resolution increases, thermal management within the display structure and surrounding areas is increasingly important. Excessive heating or large variations in temperature can reduce reliability and longevity, as well as reducing performance and uniformity. This may be particularly important where optical switching is driven thermally, which may be the case in PCM based displays for example.

It is an object of the invention to provide an improved display device which addresses one or more of the problems discussed above and/or other problems in the art.

According to an aspect of the invention, there is provided a display apparatus, comprising: an optically opaque layer and one or more stacks of additional layers provided on the optically opaque layer, wherein each stack comprises an optically switchable layer; a plurality of switching elements located on a side of the optically opaque layer opposite to the one or more stacks, each switching element being operable to apply a signal through the optically opaque layer to a switchable portion of the optically switchable layer and thereby change an appearance of the switchable portion when viewed from a viewing side of the display apparatus, wherein the surface area of the optically opaque layer on the viewing side is at least 10% larger than the total surface area of the switchable portions on the viewing side.

Thus, a display apparatus is provided in which switching elements are provided on a side of an optically opaque layer that is opposite to a viewing side. The optically opaque layer thus hides the switching elements (and any associated electronics) from a user's view, improving the aesthetic appearance of the display apparatus.

Applying a signal, for example an electrical signal or thermal signal, through the optically opaque layer may cause heating of the optically opaque layer or surrounding elements. The inventors have found that increasing a size of the optically opaque layer (to at least 10% larger than the total surface area of the switchable portions), thereby providing an extended optically opaque layer, increases the heat capacity of the optically opaque layer for a given thickness, thereby reducing overall temperature rise and temperature fluctuations. Additionally, the increased area provides room for active or passive cooling elements to be provided in thermal contact with the optically opaque layer, thereby further improving thermal control.

In an embodiment, the optically opaque layer is metallic. This may be particularly relevant where the optically opaque layer is configured to be reflective. Metallic materials tend to have high thermal conductivity, which further enhances the thermal control advantages provided by the extended optically opaque layer.

In an embodiment, the optically switchable layer comprises a phase change material (PCM). The PCM is switchable, optionally by application of heat, between a plurality of stable states. Each of the stable states has a different refractive index relative to each of the other stable states.

The geometry in which an optically switchable layer is provided above an optically opaque layer is particularly appropriate to PCM based display apparatus. Furthermore, unlike the optically switchable layer in other types of display (e.g. LCD), the PCM is relatively low cost and does not need to be encapsulated for protection. The PCM can therefore be extended easily to the same extent as the optically opaque layer, thereby further enhancing the uniformity of the outer appearance of the display apparatus. Furthermore, this geometry provides manufacturing flexibility. The display apparatus can easily be arranged for example such that layers in front of the optically opaque layer, including the PCM, can be reversibly removed (e.g. peeled off) and replaced with different layers. The display apparatus can therefore be customised, upgraded and/or repaired easily and at low cost, without needing to expose the switching elements and associated electronics provided beneath the optically opaque layer.

In an embodiment, the plurality of switching elements comprises a plurality of heater elements, each heater element being configured to apply heat to a selected region of phase change material corresponding to one of the switchable portions of the optically switchable layers, thereby changing the refractive index of the switchable portion and the appearance of the switchable portion when viewed from a viewing side of the display apparatus.

The improved thermal control is particularly advantageous where heater elements are used to perform the switching. The heat output from the heater elements will generally be higher than Joule heating provided in alternative arrangements in which signals other than thermal signals (e.g. electrical signals) are applied through the optically opaque layer.

The invention will now be further described, by way of example, with reference to the accompanying drawings, in which.

Throughout this specification, the terms "optical" and "light" are used, because they are the usual terms in the art relating to electromagnetic radiation, but it is understood that in the context of the present specification they are not limited to visible light. It is envisaged that the invention can also be used with wavelengths outside of the visible spectrum, such as with infrared and ultraviolet light.

Figure 3:
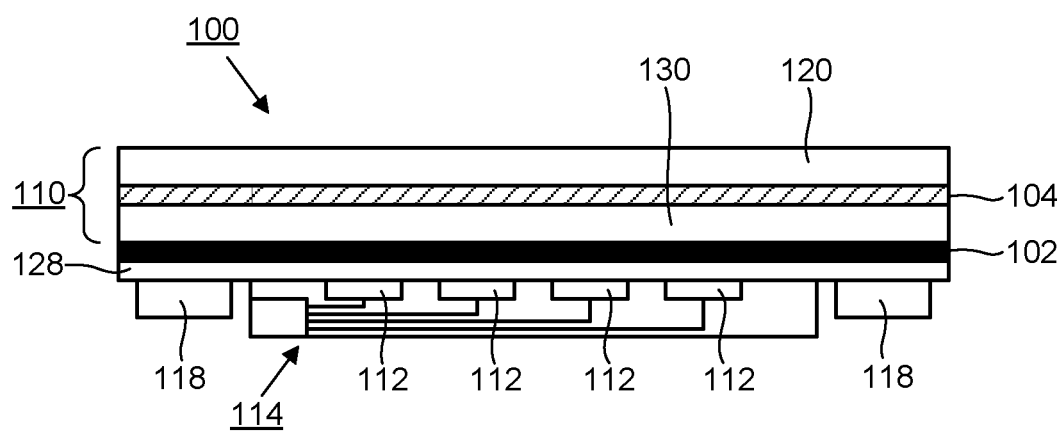
FIG. 3 depicts a schematic side sectional view of a display apparatus according to an embodiment.

Embodiments of the invention relate to a display apparatus 100. An example embodiment is depicted in FIG. 3. The display apparatus 100 comprises an optically opaque layer 102. In some embodiments the optically opaque layer is optically absorbing (e.g. having a transmittance of 5% or less, optionally 1% or less, optionally 0.01% of less). In other embodiments, the optically opaque layer is reflective (e.g. having a reflectance of 50% or more, optionally 90% or more, optionally 99% or more).

In various embodiments, including the embodiment of FIG. 3, the optically opaque layer is metallic. Metallic layers provide good reflectivity. Metallic layers also typically have high thermal and electrical conductivities.

One or more stacks 110 of additional layers are provided on the optically opaque layer 102. In the particular example of FIG. 3, a single stack 110 is provided. In other embodiments, plural stacks are provided. Each stack may correspond to a pixel or a sub-pixel of the display.

Each stack 110 comprises an optically switchable layer 104. The optically switchable layer 104 is a layer formed from a material which is capable of being switched so as to cause a region of the display to change its appearance. In embodiments of the type shown in FIG. 3 the optically switchable layer 104 comprises a phase change material (PCM). The PCM is switchable by application of an electrical signal or heat between a plurality of stable states. Each stable state has a different refractive index (optionally including a different imaginary component of the refractive index, and thereby a different absorbance) relative to each of the other stable states. The optically switchable layer 104 may however be formed in other ways, for example so as to implement an LCD or an OLED display.

In an embodiment, all layers in each stack 110 are solid-state and configured so that their thicknesses as well as refractive index and absorption properties combine so that the different states of the PCM result in different, visibly distinct, reflection spectra. Optical devices of this type are described in Nature 511, 206-211 (10 Jul. 2014), WO 2015/097468A1, WO 2015/097469A1, EP 16000280.4 and PCT/GB2016/053196.

A driving unit 114 comprising a plurality of switching elements 112 is located on a side of the optically opaque layer 102 opposite to the one or more stacks 110. Each switching element 112 applies a signal (e.g. an electrical signal or a thermal signal) through the optically opaque layer 102 to a switchable portion of the optically switchable layer 104 and thereby changes an appearance of the switchable portion when viewed from a viewing side (i.e. from above in the example of FIG. 3) of the display apparatus 100. The driving unit 114 comprises driving electronics for supplying switching signals to the switching elements 112.

Figure 1:
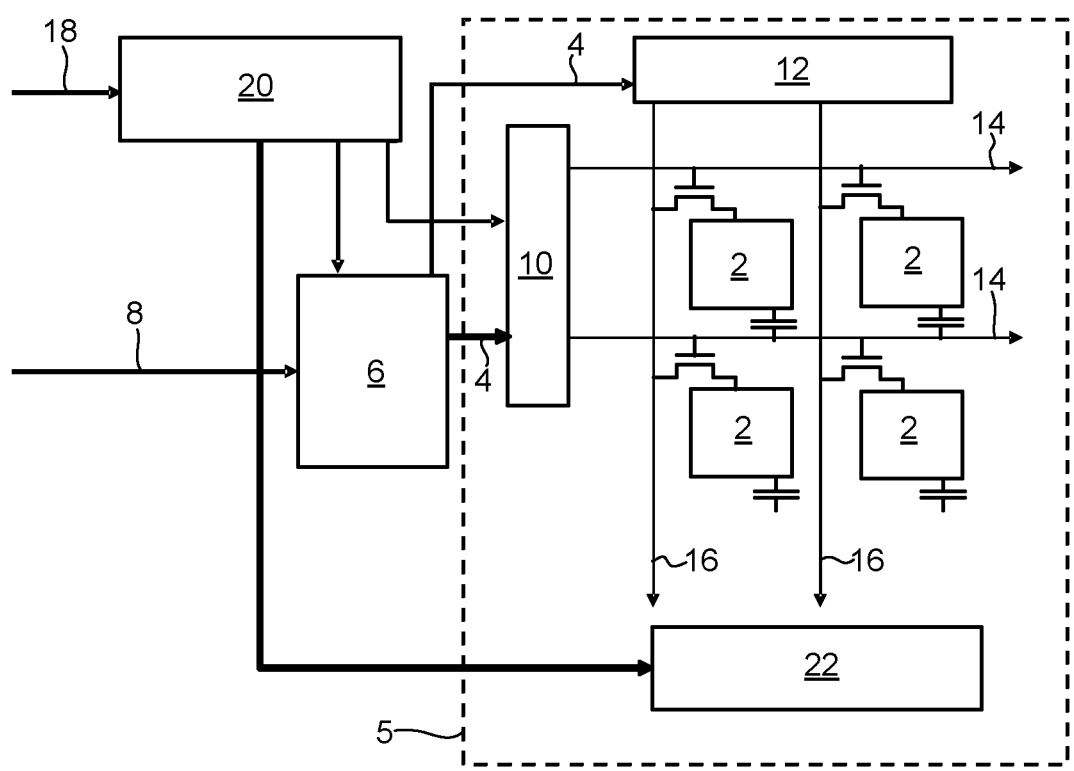
FIG. 1 depicts driving electronics for an active matrix type display according to the prior art.
Figure 2:
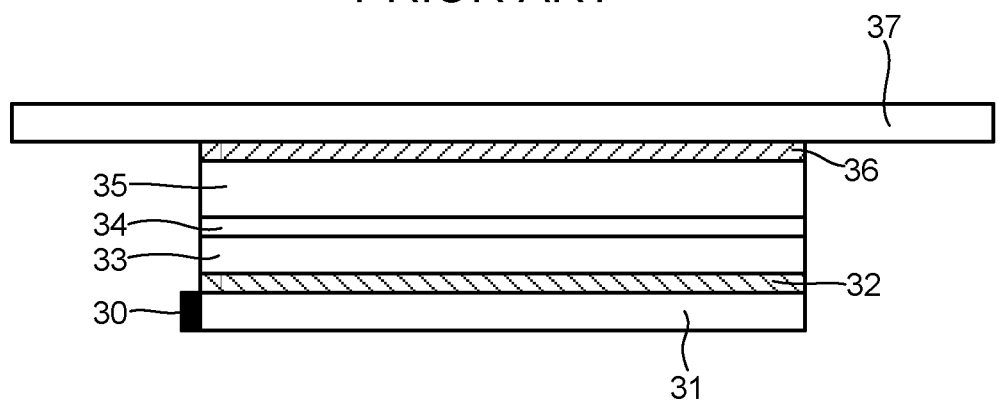
FIG. 2 depicts a schematic side sectional view of an LCD stack having an extended cover sheet according to the prior art.
Figure 4:
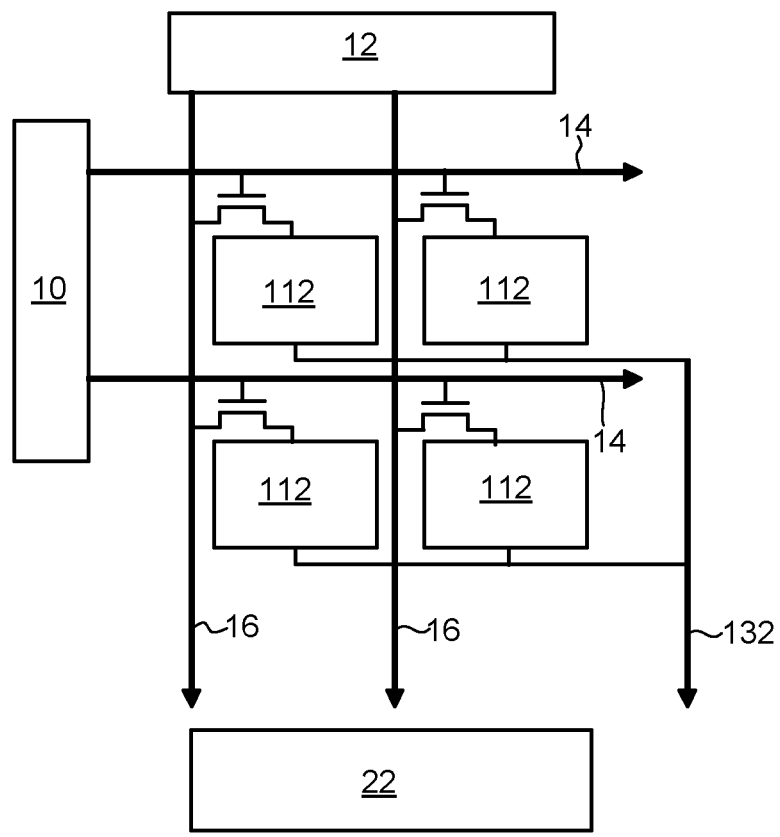
FIG. 4 depicts example driving electronics.

In an embodiment, the driving electronics are provided in the form of an active matrix array of orthogonal row and column lines 14,16, similar to the arrangement of FIG. 1, as shown schematically in FIG. 4. Each switchable portion 116 (see FIG. 5) corresponds to a different intersection between the two lines 14,16. A thin-film transistor (TFT) is provided at each intersection, having its gate terminal and one of the source and drain terminals connected to one each of the row and column lines 14,16. The remaining terminal is connected to one end of a switching element 112 (in this case a resistive heater element). The other end of the switching element 112 is connected to a common electrode 132. The common electrode 132 may be a third conducting line parallel to either the row or column lines 14,16. Input image data defines how the switching elements 112 operate to alter the state of the optically switchable layer 104 in the switchable portions 116 in order to display the input image to the viewer.

In an embodiment, the driving unit 114 is physically connected to the optically opaque layer 102 and the one or more stacks 110 via an electrically insulating (but thermally conductive) joining layer 128. The electrically insulating joining layer 128 may comprise a glue layer which allows a separately manufactured unit comprising the one or more stacks 110 to be laminated to the driving unit 114.

Figure 6:
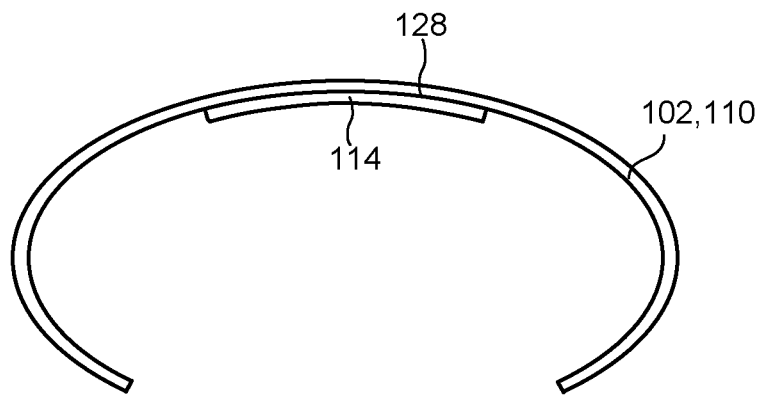
FIG. 6 depicts a schematic side view of a smartwatch comprising a display apparatus of an embodiment.

It can be seen in such an arrangement that the spatial extent, and visual appearance, of the layers above the joining layer 128 can be completely independent of the driving unit 114. This means that the layers above the joining layer 128 can be fabricated with a size, shape and appearance designed to cover most or all of the front surface (or all surfaces) of a device housing the display apparatus 100, while the driving unit 114 is positioned within the housing device, only in a region where actively updatable display information needs to be provided (i.e. the display region). An example implementation is the smart watch shown in FIG. 6. Driving unit 114 is provided underneath where the active display region of the smart watch is required (i.e. where the switchable portions 116 are located), while a structure forming all or part of the watch strap and which comprises the optically opaque layer 102 and additional layers forming the one or more stacks 110 is connected to the driving unit 114 via a joining layer 128. The optically opaque layer 102 and the one or more stacks 110 may be provided over all of an outer surface of the watch strap (or a portion of the outer surface that is significantly larger than the region immediately above the driving unit 114).

In an embodiment, the driving unit 114 is fabricated first on a relative large substrate (for example glass, silicon wafer or flexible polymer). The optically opaque layer 102 and one or more stacks 110 may then be deposited over the whole substrate area (or at least an area greater than and including the region in which the switchable portions 116 are located) as a series of sequentially deposited layers, typically by a sputtering process. The substrate area and shape may be pre-configured to match the desired front surface of a housing device which is to house the display apparatus 100, or may be subsequently cut and in the case of a flexible substrate conformed to fit the intended housing device after deposition of the optically opaque layer 102 and additional layers forming the one or more stacks 110.

In other embodiments, the driving unit 114 may be manufactured as part of the housing device, or installed into the housing device without the optically opaque layer 102 and one or more stacks 110 in place. The optically opaque layer 102 and one or more stacks 110 may be fabricated separately to be combined with the housing device at a later stage. This may be particularly advantageous where the housing device consists of a fixed shape display area set within a curved or flexible surround, and the optically opaque layer 102 and one or more stacks 110 are deposited on a flexible substrate for subsequent joining to and conforming with the driving unit 114 and curved/flexible surround.

In embodiments of the type shown in FIG. 3, the plurality of switching elements 112 comprises a plurality of heater elements. Each heater element applies heat to a selected region of PCM corresponding to one of the switchable portions 116 of the optically switchable layer 104. A refractive index of the switchable portion 116 and the appearance of the switchable portion 116 when viewed from a viewing side of the display apparatus is thus changed.

In an embodiment, each switchable portion 116 is switchable by applying a signal to the switchable portion 116 via one or more electrodes. The one or more electrodes may comprise a common electrode 132 or the one or more electrodes may be individual to each switchable portion 116. The one or more electrodes may be configured to drive current through a heater element as discussed above. In other embodiments, the one or more electrodes may be configured to apply an electrical signal directly to each switchable portion 116. Each switching element 112 comprises at least one of the electrodes for switching the switchable portion 116 corresponding to that switching element 112. Thus, at least one of the electrodes for switching each switchable portion 116 is positioned on a side of the optically opaque layer 102 that is opposite to a viewing side, thereby hiding the electrode for view. In an embodiment, each switching element 112 comprises all of the electrodes for switching the switchable portion 116 corresponding to that switching element 112. Thus, for example, the switching elements 112 may comprise not only all TFTs (or similar) required for driving switching of the switchable portions 116 but also all electrodes that are involved in the process. In an embodiment, no electrodes for switching the switchable portions 116 are located on the viewing side of the optically opaque layer 102.

The surface area of the optically opaque layer 102 on the viewing side is at least 10% larger than the total surface area of the switchable portions 116 on the viewing side, optionally at least 20% larger, optionally at least 50% larger, optionally at least 100% larger, optionally at least 200% larger, optionally at least 500% larger. In various embodiments, including the embodiment of FIG. 3, all of the additional layers provided in one or more stacks 110 supported by the optically opaque layer 102 also have surface areas on the viewing side that are each at least 10% larger than the total surface area of the switchable portions on the viewing side, optionally at least 20% larger, optionally at least 50% larger, optionally at least 100% larger, optionally at least 200% larger, optionally at least 500% larger. In various embodiments, including the embodiment of FIG. 3, the surface area on the viewing side of each and every layer of the additional layers provided in the one or more stacks 110 supported by the optically opaque layer 102 have the same surface area as the optically opaque layer 102.

As discussed in the introductory part of the description, increasing the size of the optically opaque layer 102 (and, optionally, one or more additional layers provided on the optically opaque layer 102) provides aesthetic and thermal management advantages relative to arrangements in which these layers are smaller.

Figure 5:
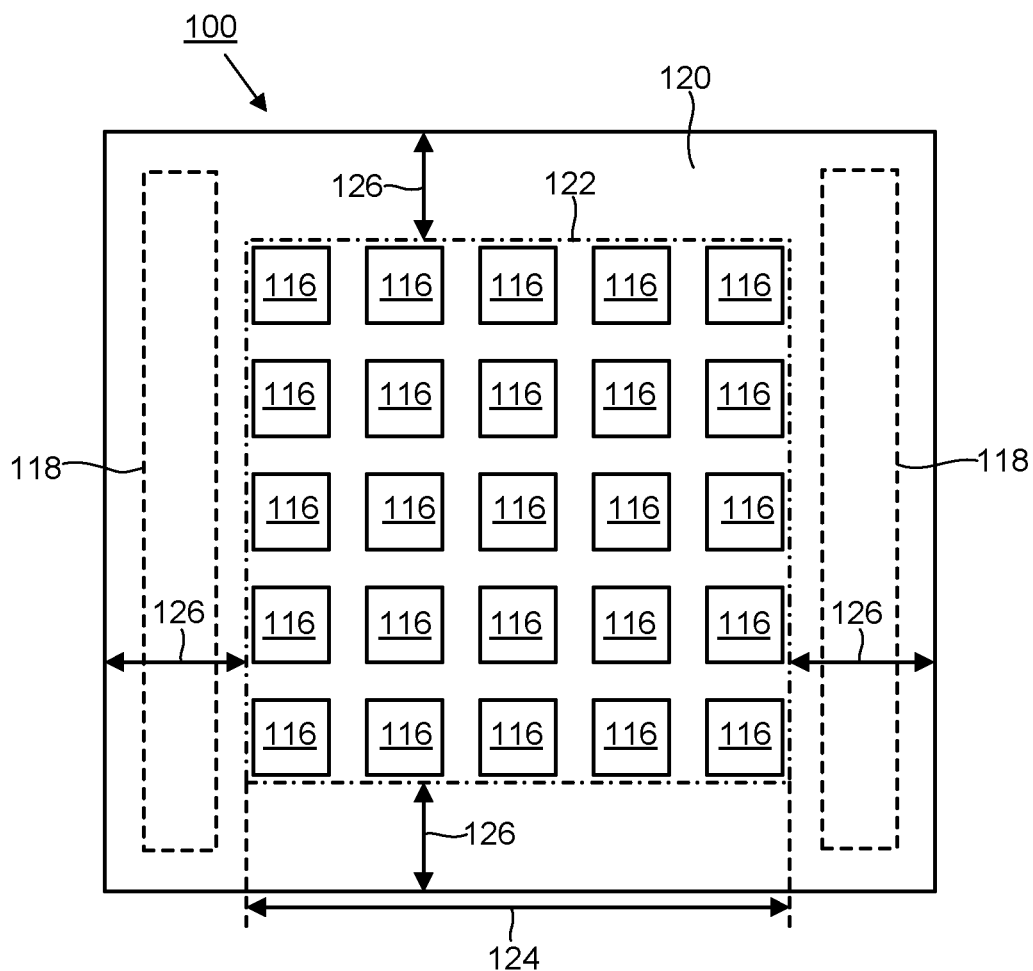
FIG. 5 depicts a schematic top sectional view, from a viewing side, of a display apparatus according to an embodiment.

FIG. 5 is a schematic top view of a display apparatus 100 according to an embodiment of the type shown in FIG. 3, viewed from a viewing side of the display apparatus 100. Switchable portions 116 of the optically switchable layer are activated so as to be visible relative to other regions of the display apparatus on the viewing side. A much smaller number of switchable portions 116 than would be provided in a practical device are shown in the interests of clarity.

The increased surface area may be provided, at least partially, by spacing the switchable portions 116 of the optically switchable layer 104 further apart relative to each other. In this case, increased surface area is provided, at least partially, by regions of the optically opaque layer 102 (and, optionally, one or more additional layers provided on the optically opaque layer 102) in between the switching portions 116. This is the case in the embodiments of FIGS. 3 and 5.

Alternatively or additionally, the increased surface area may be provided, at least partially, by extending the optically opaque layer 102 (and, optionally, one or more additional layers provided on the optically opaque layer 102) in one or more lateral directions (i.e. outward directions to the right or left in the orientation of FIG. 3 or outward directions in the plane of the page in the orientation of FIG. 4). In various such embodiments, the optically opaque layer 102 (and, optionally, one or more additional layers provided on the optically opaque layer 102) is extended in a lateral region such that the optically opaque layer 102 is at least 10% larger than the surface area of the smallest rectangular or oval bounding box containing all of the switchable portions 116 (i.e. the smallest rectangular or oval box that completely surrounds all of the switchable 116) when viewed from the viewing side of the display apparatus 100, optionally at least 20% larger, optionally at least 50% larger, optionally at least 100% larger, optionally at least 200% larger, optionally at least 500% larger. The smallest rectangular bounding box 122 is depicted schematically in FIG. 5 by dot-chain lines (slightly larger than the true smallest box so that it can be seen more clearly in the diagram).

In an embodiment, the optically opaque layer 102 extends laterally beyond the smallest rectangular or oval bounding box 122 containing all of the switchable portions 116 when viewed from the viewing side of the display apparatus 100 in all directions by at least 5% of a maximum lateral dimension of the smallest rectangular or oval bounding box 122, optionally at least 10% larger, optionally at least 25% larger, optionally at least 50% larger, optionally at least 100% larger. In the particular example of FIG. 4, the maximum lateral dimension of the smallest rectangular bounding box 122 is marked 124. Distances 126 represent the amount by which the optically opaque layer 102 extends beyond the smallest bounding box 122 in various example lateral directions. The smallest of these distances 126 must be at least 5% of the distance 124 according to embodiments of this type.

In various embodiment, as shown schematically in FIGS. 3 and 5, the display apparatus 100 comprises one or more active or passive cooling elements 118 in thermal contact with the optically opaque layer 102. The active or passive cooling elements 118 may be configured to maintain the optically opaque layer at a temperature optimised for the operation of the display apparatus 100. In this way, the extended spatial extent of the optically opaque layer 102 may allow reduced energy consumption or faster switching times over an equivalent display apparatus with conventional extent of an optically opaque layer. In an embodiment, at least a subset of the one or more active or passive cooling elements 118 are provided outside of the smallest bounding box 122 containing all of the switchable portions 116 when viewed from the viewing side of the display apparatus 100 (as in FIGS. 3 and 5). In an embodiment, at least a subset of the one or more active or passive cooling elements 118 are provided behind the optically opaque layer 102 when viewed from the viewing side of the display apparatus 100 (as in FIGS. 3 and 5), so as to be invisible to a user.

An active cooling element 118 may be implemented for example by circulating a coolant through channels in close proximity to the optically opaque layer 102 or by using Peltier elements. A passive cooling element 118 may be provided using a block of heat sink material (material having a high heat capacity and/or thermal conductivity). The block of heat sink material may be provided in direct contact with the optically opaque layer 102 or elements of high thermal conductivity that are in thermal contact with the heat sink material may be provided in direct contact with the optically opaque layer 102, thereby allowing heat to be conducted efficiently from the optically opaque layer 102 to the block of heat sink material. The provision of the extended optically opaque layer 102, as can be seen in the embodiments of FIGS. 3 and 5, provides space for at least some of the components used to implement the cooling element 118 to be provided underneath a portion of the optically opaque layer 102. High quality thermal contact between the cooling element 118 and the optically opaque layer 102 can be made more easily than in alternative arrangements where the optically opaque layer can only be accessed from the side. Additionally, the components of the cooling element 118 which are provided behind the optically opaque layer 102 are hidden from the view of the user and therefore do not have any negative aesthetic effect.

In various embodiments, including the embodiments of the FIGS. 3 and 5, driving electronics for driving the switching elements 112 are provided behind the optically opaque layer 102 when viewed from the viewing side of the display apparatus 100. Extending the optically opaque layer 102 provides more room for providing such electronics outside of the region of the switchable portions 116 while still being hidden by the optically opaque layer 102. The display apparatus 100 can therefore be made thinner without compromising aesthetics (e.g. by allowing driving electronics to be visible or by providing additional darkened cover sheets etc.).

In an embodiment, the one or more stacks 110 of additional layers consists of a single stack 110 comprising an optically switchable layer 104 having the same surface area as the optically opaque layer 102.

In an embodiment, the single stack 110 comprises a spacer layer 130 provided between the optically opaque layer 102 and the optically switchable layer 104. The spacer layer 130 has the same surface area as the optically opaque layer 102. In an embodiment, the one or more stacks 110 of additional layers define a plurality of pixels, each pixel comprising a plurality of sub-pixels that are individually switchable via the plurality of switching elements 112. Each sub-pixel provides a different set of optical properties than other sub-pixels of the pixel. In an embodiment, the different set of optical properties comprise different colours.

In an embodiment, the one or more stacks 110 of additional layers are reversibly removable from the optically opaque layer 102 or reversibly removable together with the optically opaque layer 22 from elements below the optically opaque layer 22 (including the plurality of switching elements 112, cooling elements, driving electronics, etc.). As discussed in the introductory part of the description, this feature provides increased manufacturing flexibility. This feature can be implemented particularly efficiently in the case where the one or more stacks 110 of additional layers consists of a single stack 110. In this case positioning of the switching elements 112 relative to the stack 110 does not need to be controlled with high accuracy, because the position of the array of switching elements 112 will determine the position of any image displayed by the display apparatus 100. The positioning of the stack 110 will have no effect on the position of the image. This feature makes the provision of a reversibly removable stack 110 particularly practical. In an embodiment, the stack 110 is provided as a separate transferable section, optionally as a flexible film which may be peeled on-and-off the optically opaque layer 102 (or other layer), or as a pre-shaped unit which can be repeatably clipped into place. The stack 110 can be exchanged for an alternative stack 110 having a structure that is modified to provide different optical characteristics, for example different colour or other visual appearance. This feature allows a user to customise and change the appearance of their device.

In other embodiments, the one or more stacks 110 comprise a plurality of stacks defining a pattern of sub-pixels of two or more types. Each stack 110 of a different type has a different arrangement of layers and/or thicknesses of those layers. In embodiments of this type the plurality of stacks 110 needs to be positioned in registration with the switching elements 112. This registration may be only one-dimensional, i.e. repeating vertically uniform stripes of different sub-pixel types which are positioned in registration with the columns of the backplane matrix, with no requirement for registration in the vertical direction. If the sub-pixel pattern of the stacks 110 is two-dimensional then registration in both directions may be necessary.

In the above embodiments, the one or more stacks 110 each comprise only a single optically switchable layer (e.g. PCM). This is not essential. In other embodiments, plural optically switchable layers may be provided. The additional optically switchable layer or layers may enhance the contrast or expand the range of possible colours producible by the display. The plural optically switchable layers may for example comprise a switchable attenuator. Where a plurality of stacks 110 are provided, switchable attenuator layers in different stacks together provide a pixelated switchable attenuator. The pixelated switchable attenuator may be positioned above other optically switchable layers (e.g. PCM) and in registration with the switching elements 112.

In an embodiment, the optically opaque layer 102 and the one of more stacks of additional layers are provided on a flexible support substrate 140. This allows the display apparatus 100 to adopt non-planar shapes, allowing application of the display apparatus 100 in a wide variety of contexts, including contexts in which curved screens may be desirable, such as in smart watches or large screen TVs.

In embodiments in which the optically switchable layer 104 comprises a PCM, the PCM may comprise, consist essentially of, or consist of, one or more of the following: an oxide of vanadium (which may also be referred to as VOx); an oxide of niobium (which may also be referred to as NbOx); an alloy or compound comprising Ge, Sb, and Te; an alloy or compound comprising Ge and Te; an alloy or compound comprising Ge and Sb; an alloy or compound comprising Ga and Sb; an alloy or compound comprising Ag, In, Sb, and Te; an alloy or compound comprising In and Sb; an alloy or compound comprising In, Sb, and Te; an alloy or compound comprising In and Se; an alloy or compound comprising Sb and Te; an alloy or compound comprising Te, Ge, Sb, and S; an alloy or compound comprising Ag, Sb, and Se; an alloy or compound comprising Sb and Se; an alloy or compound comprising Ge, Sb, Mn, and Sn; an alloy or compound comprising Ag, Sb, and Te; an alloy or compound comprising Au, Sb, and Te; and an alloy or compound comprising Al and Sb (including the following compounds/alloys in any stable stoichiometry: Ge SbTe, VOx, NbOx, GeTe, Ge Sb, GaSb, AgInSbTe, InSb, InSbTe, InSe, SbTe, TeGeSbS, AgSbSe, SbSe, GeSbMnSn, AgSbTe, AuSbTe, and AlSb). Preferably, the PCM comprises one of $Ge_2Sb_2Te_5$ and $Ag_3In_4Sb_{76}Te_{17}$. Furthermore, any of the above materials can comprise one or more dopants, such as C or N. Other materials may be used.

PCMs are known that undergo a drastic change in both the real and imaginary refractive index when switched between amorphous and crystalline phases. The switching can be achieved for example by heating induced by suitable electric pulses or by a light pulse from a laser light source, or, as in the embodiments described above, by thermal conduction of heat generated at a heating element to the PCM. There is a substantial change in the refractive index when the material is switched between amorphous and crystalline phases. The material is stable in either state. Switching can be performed an effectively limitless number of times. However, it is not essential that the switching is reversible.

A further enhancement applicable to all embodiments is that the PCM does not have to be switched simply between a fully crystalline and a fully amorphous state. A mixture of phases can be achieved, such as 20% crystalline, 40% crystalline etc. The resulting effective refractive index of the material is somewhere between the two extremes of fully crystalline and fully amorphous depending on the degree of partial crystallisation. Between four and eight distinct mixed phases can be readily achieved, having the corresponding number of different detectable reflectivities, but with appropriate control, the number can be much higher, such as 128.

Although some embodiments described herein mention that the material layer is switchable between two states such as crystalline and amorphous phases, the transformation could be between any two solid phases, including, but not limited to: crystalline to another crystalline or quasi-crystalline phase or vice-versa; amorphous to crystalline or quasi-crystalline/semi-ordered or vice versa, and all forms in between. Embodiments are also not limited to just two states.

In an embodiment, the PCM comprises $Ge_2Sb_2Te_5$ (GST) in a layer less than 200 nm thick. In another embodiment, the PCM comprises GeTe in a layer less than 100 nm thick.

The optically opaque layer 102 may comprise a thin metal film, composed for example of Au, Ag, Al, or Pt. If this layer is to be partially reflective then a thickness in the range of from 5 to 15 nm might be selected, otherwise the layer is made thicker, such as 100 nm, to be substantially totally reflective.

The additional layers forming each stack 110 may be deposited using sputtering in the case of inorganic material layers such as the PCM, ITO, $SiO_2$, and so on, which can be performed at a relatively low temperature of 100 C or even 70 C or lower. Polymeric layers can be formed by spin-coating and curing. Additional layers may also be provided as necessary. The low temperature process means that the optical apparatus 100 does not have to be fabricated at the same time as the article comprising the optical apparatus 100 (the article might be, for example, window glazing); the optical apparatus 100 can be retro-fitted as a surface coating applied later e.g. to existing windows or panels.

In an embodiment, the one or more stacks 110 of additional layers further comprises a spacer layer 130 (which may comprise a single layer or a plurality of different layers)

provided between the optically opaque layer 102 and the optically switchable layer 104 in the same stack 110 as the spacer layer 130. The thickness and refractive index of the material or materials forming the spacer layer 130 are chosen to create a desired spectral response (via interference).

Additionally or alternatively, in various embodiments, each of the one or more stacks 110 of additional layers further comprises a capping layer 120 (which may comprise a single layer or a plurality of different layers). The optically switchable layer 104 in each stack 110 is provided between the capping layer 120 and the optically opaque layer 102. As with the spacer layer 130, the thickness and refractive index of the material or materials forming the capping layer 120 are chosen to create a desired spectral response (via interference). Arrangements in which the spacer layer 130 and/or the capping layer 120 each comprise two or more layers of different material having different complex refractive indices, so as to expand the range of colours and/or other optical effects producible by the display apparatus 100, are discussed in PCT/GB2016/053196.

Materials which may be used to form the spacer layer 130 and the capping layer 120 may include (but are not limited to) ZnO, $TiO_2$, $SiO_2$, $Si_3N_4$, TaO and ITO.

In the embodiments described above, the switching elements 112 comprise heater elements for switching PCM. This is not essential. In other embodiments, the switchable portions 116 are defined by more conventional independently addressable electrode areas, to which an electrical voltage or current signal may be delivered through the optically opaque layer 102 (which should in this case provide an electrically conductive path from the switching elements 112 to the switchable portions 116). The optically switchable layer 104 may comprise any electro-optical material, such as a liquid crystal material, electroluminescent material such as an OLED, or an e-ink material. In embodiments of this type a transparent common electrode may be positioned above the optically switchable layer 104. The common electrode may extend over the full surface area of the optically opaque layer to maintain the uniform appearance of regions within and outside of the region where the switchable portions 116 are located. In these and previous embodiments, the optically opaque layer 102 may be anisotropically conductive, or may be segmented or partially segmented with gaps or non-conductive regions too small to be visible so as to prevent the signal delivered to a particular switching element 112 being spread out within the plane of the display apparatus 100 before reaching the optically switchable layer, causing crosstalk.

In further embodiments, the optically opaque layer 102 acts as a common electrode for driving the switching elements 112. In embodiments of this type, a terminal of each switching element 112 may be connected to the optically opaque layer through a via in the joining layer 128.

In further embodiments, a passive matrix using non-linear selector elements rather than an active matrix is used to allow addressing signals to be directed to each switchable portion 116 independently, as described in European patent application EP 16002061.6. The electronically addressable switchable portions 116 are defined by a segmented pattern of electrodes, each of which is directly connected to electronic control circuitry rather than by a set of row/column lines.

The display apparatus 100 may be utilised in any device requiring actively updatable display information to be shown from a portion of the device surface, and which would benefit from the improved thermal management, the improved manufacturing flexibility and/or the design freedom to make some or all of the non-display device surface area visually identical to the display in at least one of its states. Devices which may benefit in particular from the capability to make the display portion effectively invisible within the larger device surface when the display is off, and have the display information appear out of an apparently featureless surface could include: wearable devices such as smart watches and fitness trackers, smartphones (in which the display apparatus may act as the primary display, or as a secondary "notification" type display), automotive information displays blended with the dashboard, console or other interior features, mirror, partial mirror or largely transparent glazing type displays for automotive, home, bathroom or personal mobile use, displays within domestic appliance or home electronic (TV, HiFi, home automation device) equipment, "internet-of-things" devices, reconfigurable touch input devices such as laptop and tablet PC trackpads, keyboards, e-readers, vehicle exterior panels for colour changing/customisation purposes, for example active camouflage, and others.

The invention claimed is:

1. A display apparatus, comprising:
an optically opaque layer and one or more stacks of additional layers provided on the optically opaque layer, wherein each stack comprises an optically switchable layer comprising a phase change material, the phase change material being switchable between a plurality of stable states, each of the stable states having a different refractive index relative to each of the other stable states;
a plurality of switching elements located on a side of the optically opaque layer opposite to the one or more stacks, each switching element being operable to apply a signal through the optically opaque layer to a switchable portion of the optically switchable layer and thereby change an appearance of the switchable portion when viewed from a viewing side of the display apparatus, wherein
each switchable portion of the optically switchable layer is switchable by applying a signal to the switchable portion via one or more electrodes;
each switching element comprises all of the electrodes for switching the switchable portion corresponding to that switching element, such that no electrodes for switching the switchable portions are located on the same side of the optically opaque layer as the one or more stacks of additional layers; and
the surface area of the optically opaque layer on the viewing side is at least 10% larger than the total surface area of the switchable portions on the viewing side.

2. The apparatus of claim 1, wherein the optically opaque layer is metallic.

3. The apparatus of claim 1, wherein the optically opaque layer is a reflective layer.

4. The apparatus of claim 1, wherein the phase change material is switchable by application of heat between the plurality of stable states.

5. The apparatus of claim 4, wherein the plurality of switching elements comprises a plurality of heater elements, each heater element being configured to apply heat to a selected region of phase change material corresponding to one of the switchable portions of the optically switchable layers, thereby changing the refractive index of the switchable portion and the appearance of the switchable portion when viewed from a viewing side of the display apparatus.

6. The apparatus of claim 1, wherein the phase change material comprises one or more of the following:
- an oxide of vanadium;
- an oxide of niobium;
- an alloy or compound comprising Ge, Sb, and Te;
- an alloy or compound comprising Ge and Te;
- an alloy or compound comprising Ge and Sb;
- an alloy or compound comprising Ga and Sb;
- an alloy or compound comprising Ag, In, Sb, and Te;
- an alloy or compound comprising In and Sb;
- an alloy or compound comprising In, Sb, and Te;
- an alloy or compound comprising In and Se;
- an alloy or compound comprising Sb and Te;
- an alloy or compound comprising Te, Ge, Sb, and S;
- an alloy or compound comprising Ag, Sb, and Se;
- an alloy or compound comprising Sb and Se;
- an alloy or compound comprising Ge, Sb, Mn, and Sn;
- an alloy or compound comprising Ag, Sb, and Te;
- an alloy or compound comprising Au, Sb, and Te; and
- an alloy or compound comprising Al and Sb.

7. The apparatus of claim 1, wherein the phase change material comprises one of GeTe, $Ge_2Sb_2Te_5$ and $Ag_3In_4Sb_{76}Te_{17}$.

8. The apparatus of claim 1, wherein the optically opaque layer is extended in a lateral region such that the optically opaque layer is at least 10% larger than the surface area of the smallest rectangular or oval bounding box that contains all of the switchable portions when viewed from the viewing side of the display apparatus.

9. The apparatus of claim 1, wherein the optically opaque layer extends laterally beyond the smallest rectangular or oval bounding box that contains all of the switchable portions when viewed from the viewing side of the display apparatus, in all directions by at least 5% of a maximum lateral dimension of the smallest rectangular or oval bounding box.

10. The apparatus of claim 1, further comprising one or more active or passive cooling elements in thermal contact with the optically opaque layer.

11. The apparatus of claim 10, wherein at least a subset of the one or more active or passive cooling elements are provided outside of the smallest bounding box containing all of the switchable portions when viewed from the viewing side of the display apparatus.

12. The apparatus of claim 10, wherein at least a subset of the one or more active or passive cooling elements are provided behind the optically opaque layer when viewed from the viewing side of the display apparatus.

13. The apparatus of claim 1, further comprising driving electronics for driving the switching elements, wherein the driving electronics are behind the optically opaque layer when viewed from the viewing side of the display apparatus.

14. The apparatus of claim 1, wherein the one or more stacks of additional layers are configured to be reversibly removable from the optically opaque layer or reversibly removable together with the optically opaque layer from elements below the optically opaque layer.

15. The apparatus of claim 1, wherein each of the one or more stacks of additional layers further comprises a spacer layer, each spacer layer being provided between the optically opaque layer and the optically switchable layer that is in the same stack as the spacer layer.

16. The apparatus of claim 1, wherein each of the one or more stacks of additional layers further comprises a capping layer, wherein the optically switchable layer in each stack is provided between the capping layer and the optically opaque layer.

17. The apparatus of claim 1, wherein the one or more stacks of additional layers consists of a single stack comprising an optically switchable layer having the same surface area as the optically opaque layer.

18. The apparatus of claim 17, wherein the single stack comprises a spacer layer provided between the optically opaque layer and the optically switchable layer, the spacer layer having the same surface area as the optically opaque layer.

19. The apparatus of claim 1, wherein the one or more stacks of additional layers define a plurality of pixels, each pixel comprising a plurality of sub-pixels that are individually switchable via the plurality of switching elements, each sub-pixel providing a different set of optical properties than other sub-pixels of the pixel.

20. The apparatus of claim 19, wherein the different set of optical properties comprise different colours.

* * * * *